United States Patent [19]

Aoki

[11] Patent Number: 4,648,824
[45] Date of Patent: Mar. 10, 1987

[54] INJECTION STRETCHING BLOW MOLDING MACHINE

[76] Inventor: Katashi Aoki, 6037, Ohazaminamijo, Sakakimachi, Hanishina-gun, Nagano-ken, Japan

[21] Appl. No.: 734,069

[22] Filed: May 15, 1985

[30] Foreign Application Priority Data

May 18, 1984 [JP] Japan .................... 59-100164

[51] Int. Cl.⁴ .......................................... B29C 49/06
[52] U.S. Cl. .................................. 425/150; 264/538; 425/528; 425/529; 425/534; 425/539; 425/540
[58] Field of Search ............... 264/538; 425/526, 528, 425/529, 534, 540, 539, 190, 150

[56] References Cited

U.S. PATENT DOCUMENTS

| 3,334,379 | 8/1967 | Settembrini | 425/540 |
| 4,105,391 | 8/1978 | Aoki | 425/526 |

Primary Examiner—Jay H. Woo
Assistant Examiner—Timothy W. Heitbrink
Attorney, Agent, or Firm—Ostrolenk, Faber, Gerb & Soffen

[57] ABSTRACT

In accordance with the present invention, there is provided an injection stretching blow molding machine comprising a base secured onto a machine bed, a top plate positioned above said base and connected to said base by means of a plurality of tie rods in the peripheral edge, a movable plate slidably inserted through said tie rod and disposed movably up and down between the base and the top plate, a clamping plate above the movable plate, a transfer plate at the undersurface of said movable plate and rotable at predetermined intervals by a drive device provided in the central portion above the movable plate, the required number of hold molds consisting of split molds mounted on the undersurface of the transfer plate, said hold molds being opened and closed in a radial direction, an injection cavity and a blow cavity on the base closed in connection with said hold molds, an injection core and a blow core mounted at the lower side of said clamping plate and closed in connection with the hold molds from openings bored in the movable plate and the transfer plate, a stretching rod operating device and a releasing device provided above the clamping plate, and a clamping device provided above said top plate, said clamping device corresponding to the injection cavity, wherein a clamping rod of the clamping device and the clamping plate are connected, and a returning device is provided over the movable plate and the base or the tie rods.

7 Claims, 8 Drawing Figures

INJECTION STRETCHING BLOW MOLDING MACHINE

BACKGROUND OF THE INVENTION (1) Field of the Invention

This invention relates to a molding machine which can continuously perform the operation from injection molding of a preform to stretching blow molding of a synthetic resin molded article such as a bottle or a container.

(2) Description of Prior Art

A molding machine of this kind is generally known from U.S. Pat. No. 4,105,391. This molding machine has been developed by the present inventor, in which a lower base on a bed and an upper base thereabove are connected together by a tie rod at the peripheral portions, and between these two bases operations such as injection molding of a preform, temperature control, stretching blow molding and removal of a molded article may be carried out successively.

The aforesaid machine is also designed so that devices for an injection core and a blow core and drive devices are mounted on the upper base, a rotary disc having a neck mold at the lower side thereof is provided on the underside of the upper base, and a preform injection molded into the neck mold and a stretching blow molded article may be transferred by the rotary disc.

Such a molding machine as described has the disadvantages that since in this machine, the lower base and the upper base are in the locked state, a spacing between both the bases cannot be varied according to a dimension of height of the molded article; even if the spacing has an allowance, the dimension of height is subjected to molding limit, lacking in general-purpose use; and in addition, in molding small bottles, injection and blow cavities have to be raised every time.

In addition, it is necessary that the injection cavity side is moved up and down with respect to the neck mold on the upper base side to open and close the mold, and therefore the injection apparatus cannot be always placed in nozzle touch with the injection cavity and a hot runner block, because of which means for nozzle touch operation every opening and closing and for prevention of leakage of resins from the nozzles are required.

Furthermore, there are disadvantages in that clamping devices have to be provided on both the injection cavity and injection core, and since the injection cavity is connected to the upper end of the clamping rod, a side run-out occurs in the injection cavity during closing due to the side pressure during the nozzle touching, causing the preform to be one-sided in wall thickness.

Moreover, there poses various problems in that in the transfer accomplished by the rotary disc, the preform and the molded article depict a circular locus whereas the mold cavity is provided on the lower base parallel to the tangential line of the circular locus and to be opened and closed in a radial direction, and therefore, the molded article becomes impinged upon the end of the blow cavity and damaged during rotation and transfer thereof unless opening extremely greater than a diameter of the molded article is carried out.

SUMMARY OF THE INVENTION

This invention has been achieved to solve the above-described problems with respect to prior art. An object of the invention is to provide a new injection stretching blow molding machine in which despite this molding machine is an injection stretching blow molding machine for transferring a preform and a molded article by a transfer disc of a rotary type, the injection apparatus can be always placed in nozzle touching with the injection cavity locked whereby a one-sided wall thickness of the preform possibly resulting from a slight side run-out of the injection cavity due to the side pressure during the nozzle touching can be prevented.

It is a further object of this invention to provide an injection stretching blow molding machine in which it is free from molding limit due to the dimension of height of the molded article; even in molding small bottles and the like, the injection mold need not be raised; and the molded article during the transfer thereof does not impinge upon the blow cavity to be damaged by the rotation of the transfer disc after the preform and molded article have been removed above the injection and blow cavities.

To achieve these objects, the present invention provides an injection stretching blow molding machine comprising a base secured onto a machine bed, a top plate positioned above said base and connected to said base by means of a plurality of tie rods in the peripheral edge, a movable plate slidably inserted through said tie rod and disposed movably up and down between the base and the top plate, a clamping plate above the movable plate, a transfer plate at the undersurface of said movable plate and rotable at predetermined intervals by a drive device provided in the central portion above the movable plate, the required number of hold molds consisting of split molds mounted on the undersurface of the transfer plate, said hold molds being opened and closed in a radial direction, an injection cavity and a blow cavity on the base closed in connection with said hold molds, an injection core and a blow core mounted at the lower side of said clamping plate and closed in connection with the hold molds from openings bored in the movable plate and the transfer plate, a stretching rod operating device and a releasing device provided above the clamping plate, and a clamping device provided above said top plate, said clamping device corresponding to the injection cavity, wherein a clamping rod of the clamping device and the clamping plate are connected, and a returning device is provided over the movable plate and the base or the tie rods.

In the injection stretching blow molding machine constructed as described above, the clamping plate and the movable plate may be successively moved in a direction of the base on the machine bed by the stretching of the clamping rod of the clamping device provided on the top plate, whereby the injection cavity provided on the base, the hold molds provided on the transfer plate at the undersurface of the movable plate and the injection core at the lower side of the clamping plate may be clamped and at the same time, a preform of the hold mold may be positioned in the central portion of the blow mold.

After molding has been finished, the clamping rod is contracted, and when the clamping plate is pulled back upwardly, pressure against the movable plate is removed and then the movable plate is moved up to its origial position together with the clamping plate by the returning device, and the upward movement of the clamping plate causes the stepwise opening whereby the preform and molded article in the hold molds are positioned above the injection and blow cavities. As the result, even if the injection and blow cavities are in the state where they are placed on the lower base, the preform and molded article may be transferred to the succeeding operating stations by the intermittent movement of the rotary disc without being affected by the aforesaid state.

This invention will be further described in detail by way of embodiments shown in the accompanying drawings.

BRIEF DESCRIPTION OF THE DRAWINGS

The drawings show two embodiments of the injection stretching blow molding machine in accordance with the present invention.

DETAILED DESCRIPTION OF THE INVENTION

Figure 1:
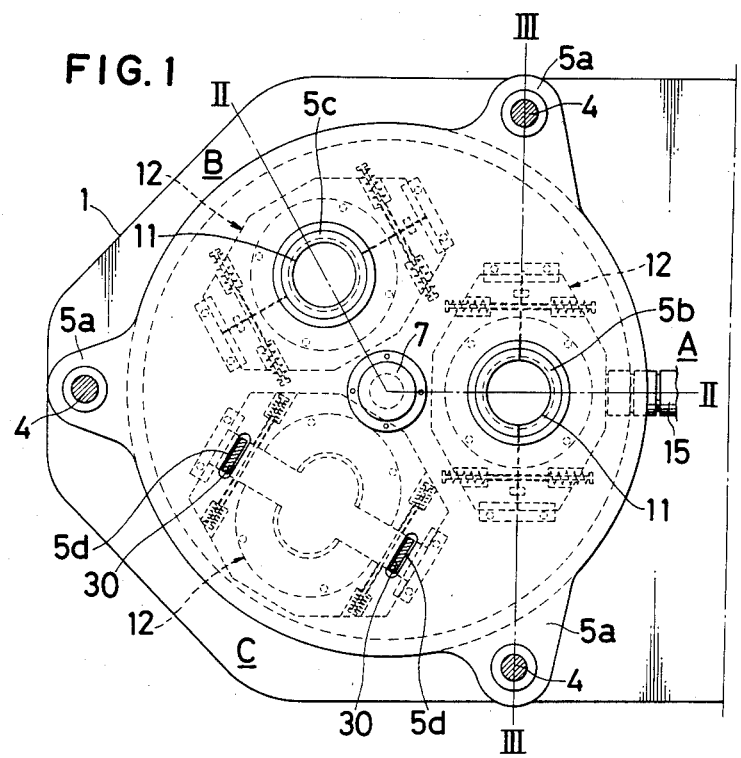
FIG. 1 is a sectional view taken on line I—I of FIG. 2.

In the drawings, a reference numeral 1 designates a machine bed, on which a base 2 is fixed. Above the base 2, a top plate 3 is connected to be positioned horizontally on the base 2 by means of tie rods provided at three points on the peripheral edge.

Between the base 2 and the top plate 3, a movable plate 5 and a clamping plate 6 are disposed above and below, movably up and down and movably to and from each other with lugs 5a and 6a projected at three points on the peripheral edge slidably inserted over the tie rods 4, 4.

A circular transfer plate 8 rotatable every angle of 120° is mounted on the undersurface of the movable plate 5 at the lower side of the clamping plate 6 movably by a central shaft 10 while embracing the periphery thereof by a member 9, said transfer plate 8 being rotated by a hydraulically or elecrically operated drive device 7 secured to the central portion above the movable plate 5. The rotation of the transfer plate 8 is effected by use of a cam member provided on the drive device 7 or a pin and arm member provided between the shaft 10 and the transfer plate 8, though not shown.

Hold molds 12 consisting of split molds 11 mounted for opening and closing in a radial direction are positioned at three locations of the undersurface of the transfer plate 8. Stopping positions of the hold plates 12 respectively serve as an injection operating station A, a stretching blow operating station B and a releasing operating station C.

On the base 2 corresponding to the injection operating station A, an injection cavity 13 is placed on a bed seat 14, and the bed seat 14 is internally provided with a hot runner block 16 with the side of which an injection device 15 is in nozzle touching. Above the injection cavity 13, an injection core 17 closed with the hold mold 12 and the injection cavity 13 from openings 5b, 8a bored in the movable plate 5 and the transfer plate 8 is attached to the underside of the clamping plate 6.

A hydraulically-operated clamping device 18 is provided on the upper side corresponding to the injection cavity 13 of the top plate 3, and a clamping rod 19 downwardly extended while passing through the top plate 3 from the clamping device 18 and the aforesaid clamping plate 6 are connected together.

While in this embodiment, the clamping rod 19 is directly connected to the clamping plate 6, it should be noted that the clamping plate 6 and the clamping rod 19 can be connected through a crank device. In this case, a known crank device adapted to effect crank motion by a pinion and rack is mounted on the clamping plate 6 and the end of the clamping rod 19 can be connected to the crank device, though not shown. In this way, only the clamping plate 6 can be moved up and down by the expansion of the arm of the crank device, and the clamping rod 19 need not be moved up and down together with the clamping plate 6. If the clamping rod 19 is designed to be actuated when the arm is expanded, opening and clamping may be carried out at a high speed.

On the base 2 corresponding to the stretching blow molding station B, a blow cavity 20 is connected to the upper end of a piston rod 22 from a pneumatically or hydraulically operated lift 21 mounted on the underside of the base, said blow cavity 20 being movable up and down. Above the blow cavity 20, a blow core 23 closed with the hold mold 12 and the blow cavity 20 from openings 5c and 8b bored in the movable plate 5 and the transfer plate 8 is attached to the underside of the clamping plate 6.

An expanding device 25 for a rod 24 which passes through the clamping plate 6 and the blow core 21 and extends into the blow cavity 20 is mounted on the upper side of the clamping plate 6, said extending rod 24 being connected to the lower end of a piston rod 26 operated by air.

Figure 6:
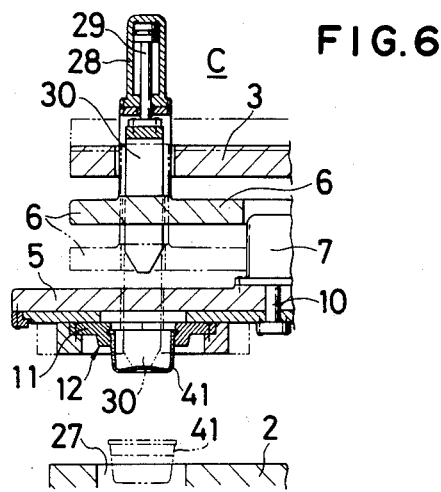
FIG. 6 is a longitudinal sectional side view showing the operation of a removal operating station.

As shown in FIG. 6, a guide hole 27 for a molded article is bored in the base 2 corresponding to the removal operating station C, and a removing device 28 is mounted on the upperside of the clamping plate 6 corresponding to the guide hole 27. This removing device 28 comprises a pair of wedge-like opening plates 30 mounted on the lower end of a piston rod 29 operated by air, said opening plates 30 passing through the clamping plate 6 and the movable plate 5 to radially push open the split molds 11 of the hold molds 12 to release molded articles held by the hold molds 12.

A reference numeral 31 designates a returning device for the movable plate 5, the returning device comprising a flange 32 provided on the tie rod 4 and a coiled spring 33 in the periphery of the tie rod retained over the flange 32 and the lug 5a of the movable plate 5 to control the returning position by the engagement between the end of a cover member 34 and the flange 32.

Figure 7:
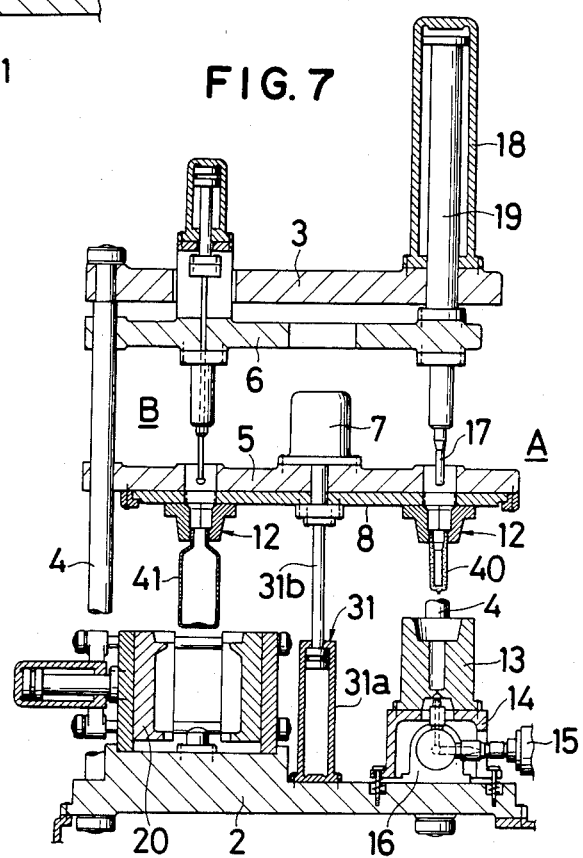
FIG. 7 is the same longitudinal sectional side view as the aforesaid FIG. 1 in a second embodiment of the invention.
Figure 8:
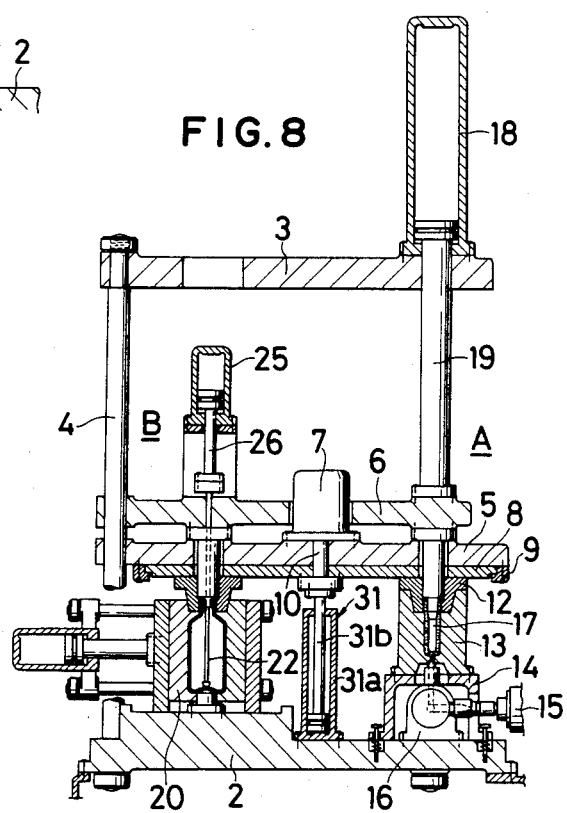
FIG. 8 is likewise a longitudinal sectional side view when the mold is clsoed.

FIGS. 7 and 8 illustrate a second embodiment of the present invention in which there is provided a pair of split molds adapted to radially open and close the blow cavity 20, and the aforesaid returning device 31 comprises a pneumatically or hydraulically operated cylinder 31a provided over the base 2 and the central portion of the transfer plate 8 and a piston rod 31b. Other parts in the second embodiment have the construction similar to those of the above-described first embodiment.

The operation of the first embodiment will be described hereinafter in an orderly manner.

Figure 2:
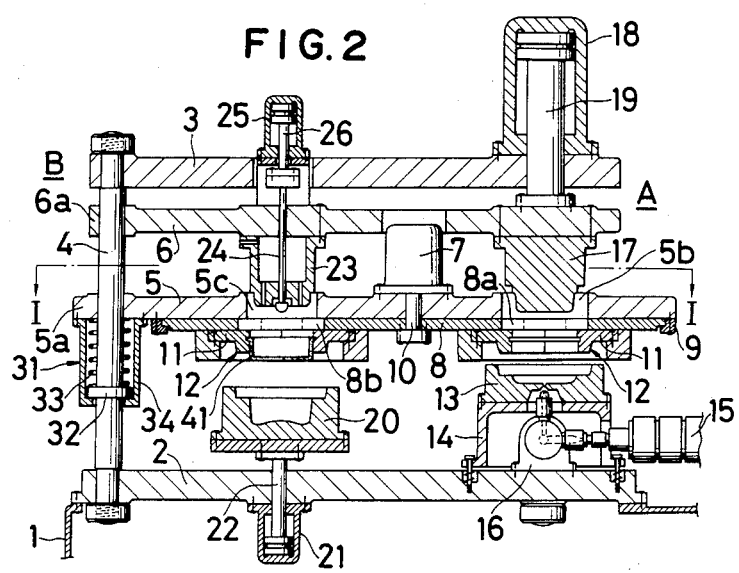
FIG. 2 is a sectional view taken on line II—II of FIG. 1.
Figure 3:
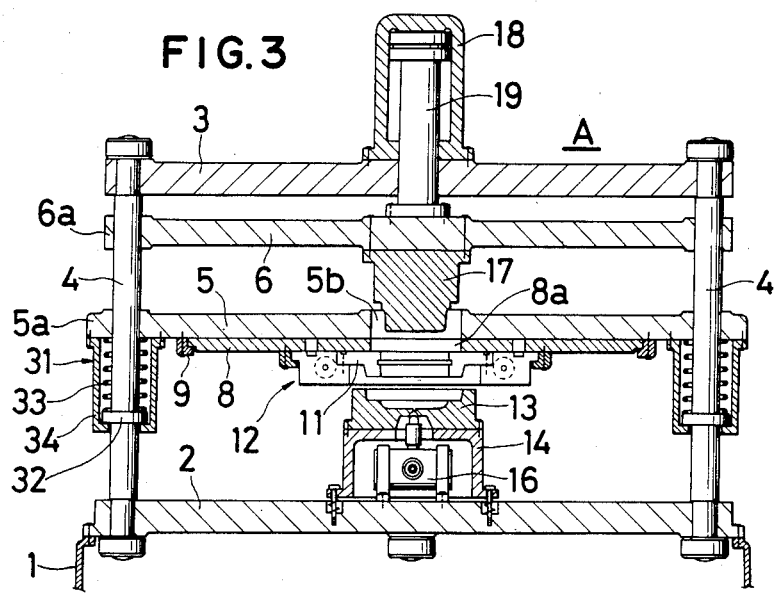
FIG. 3 is a sectional view taken on line III—III of FIG. 1.
Figure 4:
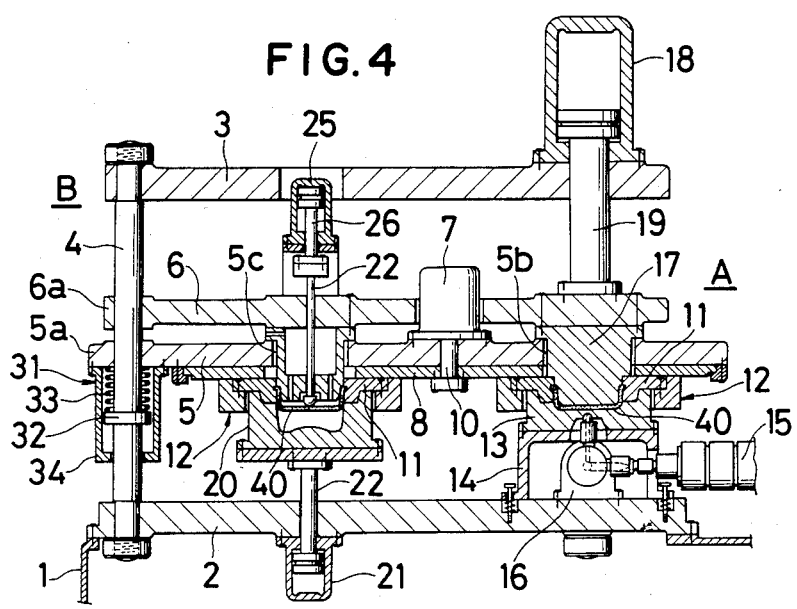
FIG. 4 is a longitudinal sectional side view when the mold is closed.

First, in the opened state shown in FIGS. 2, 3 and 6, when the clamping device 18 is actuated to extend the clamping rod 19 downwardly, the clamping plate 6 is pressed downwardly to be moved and comes into contact with the upperside of the movable plate 5. Thereby, both the injection core 17 and the blow core 23 respectively fit in the hold molds 12 from the openings 5b and 8a of the movable plate 5 and the transfer plate 8.

When the clamping rod 19 is further extended, the movable plate 5 is pressed by the clamping plate 6 and moved downwardly while compressing the coiled spring 33. It is noted that in the second embodiment, the movable plate is moved while pressing the piston rod 31b.

In the removal operating station C, the opening plate 30 (FIG. 1) when positioned according to the orientation of FIG. 7 moves down along with the clamping plate and fits into a slot 5d (see FIG. 1) of the movable plate 5 shown in FIG. 1.

The downward movement of the movable plate 5 stops at the position where the hold molds 12 and the injection cavity 13 and blow cavity 20 are closed.

Figure 5:
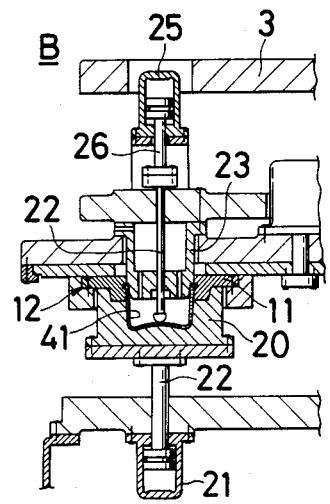
FIG. 5 is a longitudinal sectional side view of a stretching blow operating station during the stretching blow molding.

In the injection operating station A, molding of a preform 40 is accomplished, and in the stretching blow operating station B, as shown in FIG. 5, the expanding device 25 is actuated and the preform 40 is stretched axially by the extending rod 24 and air is blown from the blow core 23 to form the preform 40.

In the removal operating station C, as shown in FIG. 6, the removing device 28 is actuated, and the opening plate 30 is forced into a parting line of the split mold 11 of the hold mold 12 to push open the split mold 11 in a radial direction to release the molded article 41 from the hold mold 12.

Upon completion of the molding as described above, the clamping device 18 is actuated in a direction of opening to pull back the clamping rod 19 to its original position together with the clamping plate 6, then the pressing force relative to the movable plate 5 is released and the movable plate 5 is returned to its original position by the repulsion force of the coiled spring 33 which has been compressed, where opening occurs. The clamping plate 6 is further moved upwardly together with the clamping rod 19 whereby the injection core 17 and the blow core 23 are moved upwardly of the hold mold 12 to render the transfer plate 8 rotatable. In the second embodiment, the piston rod 31b is extended upwardly to return the movable plate to its original position.

As a consequence, the preform 40 is held by the hold mold 12 in the injection operating station A and the molded article 41 is held by the hold mold 12 in the stretching blow operating station B, and they are fed to the succeeding operating station by the 120° rotation of the transfer plate 8. Then, the subsequent molding is carried out in a process similar to that as described above.

In the present invention, as will be apparent from the above-described embodiments, the movable plate 5 provided at the underside with the transfer plate 8 comprising a rotary disc and the clamping plate 6 connected with the clamping rod 19 placed on the top plate 3 are disposed movably up and down with the returning devices 31, 31b provided on the movable plate 5 between the base 2 and the top plate 3, and the injection and blow cavities 13, 20 on the base 2, and three molds, i.e., the hold mold 12 at the undersurface of the transfer plate and the injection and blow cores 17, 22 at the lower side of the clamping plate are made to be opened and closed up and down by the movable plate 5 and the clamping plate 6. With this arrangement, the injection cavity need not be moved up and down for the purpose of closing and the injection device 15 may be always placed in nozzle touching, and no side run-out due to the side pressure during nozzle touching occurs to thereby prevent the preform from one-side wall thickness.

In addition, since the movable plate 5 is moved up and down, no molding limit involves due to the dimension of height of the molded article, and in molding small bottles and the like, the injection mold needs not be raised, thus providing the general-purpose use.

Moreover, since the transfer plate 8 is rotated after removal of the preform 40 and molded article 41 upwardly of the injection and blow cavities 13, 20, the molded article 41 is prevented from impinging upon the blow cavity 20 to be damaged during the transfer.

Furthermore, since the injection cavity 13 is placed on the base 2, the clamping device on the side of the injection cavity and the hydraulic device associated therewith can be omitted, the cost can be advantageously saved through that portion.

What is claimed is:

1. An injection stretching blow molding machine comprising:

a base secured onto a machine bed, a top plate positioned above said base and tie rods connecting said top plate to said base, a movable plate with an undersurface and having an opening bore therein, said movable plate being slidably movable along said tie rods and disposed movably up and down between the base and the top plate;

a clamping plate positioned between the movable plate and the top plate, said clamping plate having a lower side and an opening bore therein, a rotatable transfer plate located at the undersurface of said movable plate, a drive device for rotating the transfer plate, at predetermined intervals, said drive device being above the movable plate, the transfer plate having an opening bore therein;

a number of hold molds consisting of split molds being mounted on an undersurface of said transfer plate, said hold molds being opened and closed in a radial direction;

an injection cavity and a blow cavity in the base, in closed connection with said hold molds;

an injection core and a blow core mounted at said lower side of said clamping plate and in closed connection with the hold molds from said openings bored in the movable plate and the transfer plate;

a stretching rod operating device and a releasing device provided above said clamping plate said stretching rod extending through said opening bore and said blow core of said clamping plate;

a clamping device provided above said top plate, said clamping device being movable into said injection cavity, the clamping device including a clamping rod, the clamping rod and the clamping plate being connected to end other; and a returning device connected with the movable plate for moving the movable plate toward the top plate.

2. The injection stretching blow molding machine as claimed in claim 1, wherein said returning device comprises a flange provided on each tie rod and a coiled spring in the periphery of each tie rod retained between the flange and the movable plate.

3. The injection stretching blow molding machine as claimed in claim 1, wherein said returning device comprises a hydraulic cylinder provided between the base, the movable plate said hydraulic cylinder positioned on each tie rod.

4. The injection stretching blow molding machine as claimed in claim 1, further comprising a crank device for connecting said clamping plate and said clamping rod.

5. The injection stretching blow molding machine as claimed in claim 1, wherein said drive device is hydraulically operated.

6. The injection stretching blow molding machine as claimed in claim 1, wherein said drive device comprises means for rotating the transfer plate at predetermined intervals.

7. The injection stretching blow molding machine as claimed in claim 1, wherein said drive device is electrically operated.

* * * * *